United States Patent [19]

Ishida et al.

[11] Patent Number: 5,678,190
[45] Date of Patent: Oct. 14, 1997

[54] MOBILE TERMINAL WITH AUTOMATIC CALLING FEATURE

[75] Inventors: Makoto Ishida; Tetsuya Hanawa; Masahiro Konno, all of Kawasaki, Japan

[73] Assignee: Fujitsu Limited, Kanagawa, Japan

[21] Appl. No.: 340,734

[22] Filed: Nov. 16, 1994

[30] Foreign Application Priority Data

Mar. 17, 1994 [JP] Japan .................................. 6-046673

[51] Int. Cl.⁶ .................................................. H04Q 7/32
[52] U.S. Cl. ..................... 455/34.2; 455/54.1; 455/54.2; 379/59
[58] Field of Search ........................ 455/33.2, 34.2, 455/54.1, 54.2, 56.1; 379/59, 60, 216, 355

[56] References Cited

U.S. PATENT DOCUMENTS

| 4,912,756 | 3/1990 | Hop | 379/60 |
| 5,276,729 | 1/1994 | Higuchi et al. | 379/355 |
| 5,323,446 | 6/1994 | Kojima et al. | 455/33.2 |
| 5,493,604 | 2/1996 | Hirayama | 379/355 |

*Primary Examiner*—Reinhard J. Eisenzopf
*Assistant Examiner*—Thanh Le
*Attorney, Agent, or Firm*—Helfgott & Karas, P.C.

[57] ABSTRACT

When frequencies are being scanned to seize a control channel immediately after the end of a call, if there arises a call request, the call request is stored, and a calling operation is automatically initiated after a control channel has been seized. When a call request is stored, if a predetermined length of time has elapsed before a control channel is seized, the stored call request is discarded.

5 Claims, 5 Drawing Sheets

5,678,190

1

MOBILE TERMINAL WITH AUTOMATIC CALLING FEATURE

BACKGROUND OF THE INVENTION

1. Field of the Invention

The present invention relates to a mobile terminal such as a car telephone or a portable telephone.

2. Description of the Related Art

In a multi-zone structured mobile communication system, control channels and communication channels are set up in each zone. When a mobile terminal, such as a car telephone or a portable telephone, moves from one zone to the next during a call, control is performed to switch over to a new communication channel. At the completion of the call, the synthesizer in the mobile terminal is controlled so as to seize a control channel for the current zone, and the mobile terminal is placed in a standby mode to wait for an incoming call.

A mobile terminal in a multi-zone mobile communication system performs a channel scan to seize an available control channel after the end of each call. During this scan period, no transmission can be made to the base station, and any call initiating operation is disabled until a control channel is seized. However, there are cases in which, after a calling operation, the user may notice that he has dialled the wrong number, and may perform the dialling operation over again. In such cases, since the calling operation is discarded until the control channel is seized again, the user has to wait until after a prescribed length of time has elapsed. This presents a problem in terms of convenience of operation.

SUMMARY OF THE INVENTION

It is an object of the present invention to enable a call request, if made immediately after the end of a call, to be processed properly after a control channel has been seized.

According to the present invention, there is provided a mobile terminal which comprises: means for seizing a control channel by scanning through frequencies; means for storing a call request that has arisen during the time that the control channel seizing means is scanning through frequencies; and means for automatically initiating a calling operation after the control channel seizing means has seized a control channel when a call request is stored by the call request holding means.

BRIEF DESCRIPTION OF THE DRAWINGS

FIG. 4 is a flowchart for explaining the operation of a control unit 14 in the mobile terminal according to a further embodiment of the present invention.

DESCRIPTION OF THE PREFERRED EMBODIMENTS

Figure 1:
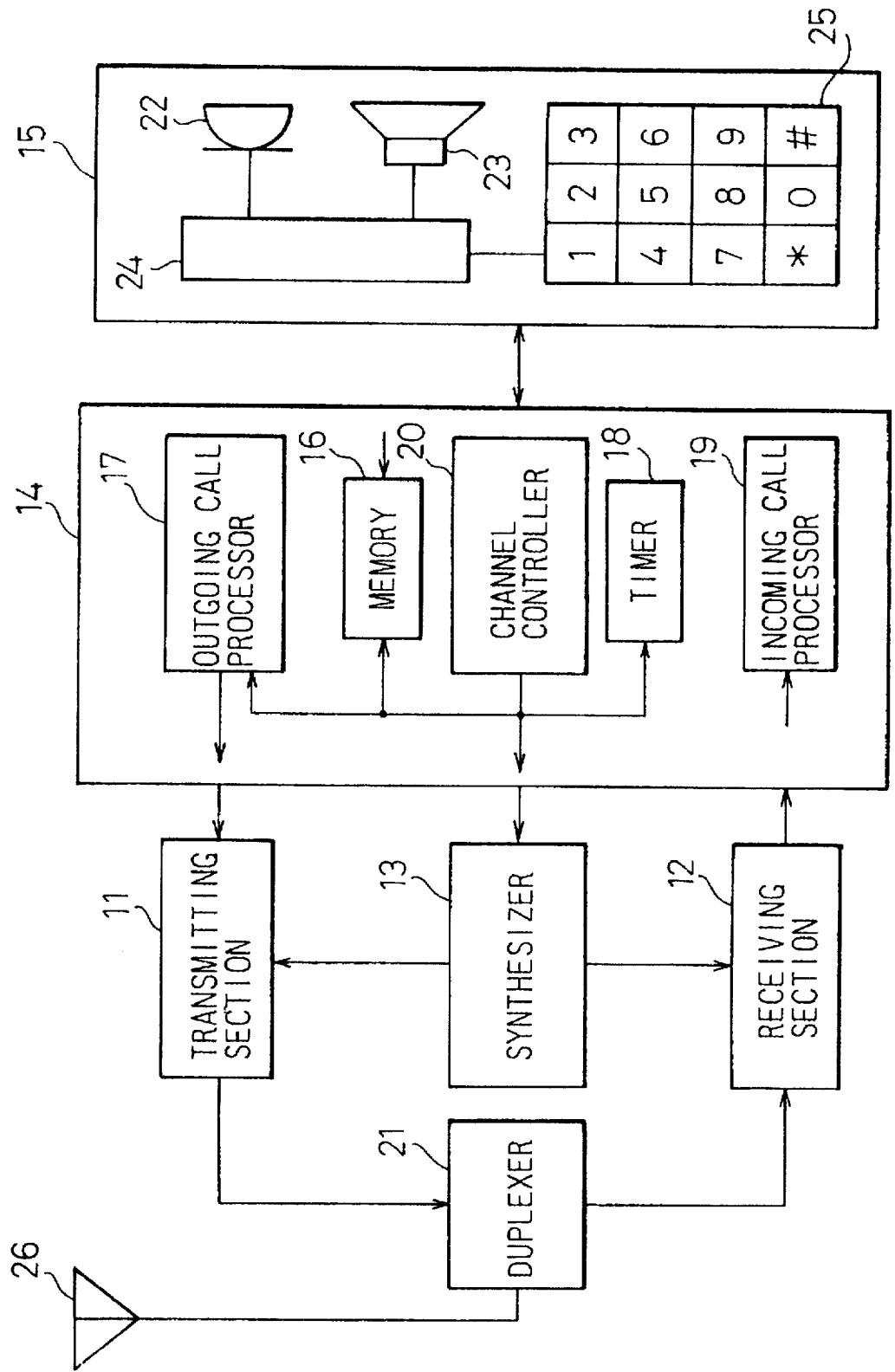
FIG. 1 is a block diagram showing the configuration of a mobile terminal according to the present invention.

FIG. 1 is a block diagram showing the configuration of a mobile terminal according to the present invention.

2

A transmitting section 11 contains a transmitting power amplifier, a mixer, a modulator, etc., and a receiving section 12 contains a high-frequency amplifier, a mixer, a demodulator, etc. On the other hand, a control unit 14 comprises a memory 16, an outgoing call processor 17, a timer 18, an incoming call processor 19, and a channel controller 20; these functions can be easily implemented using a microprocessor or the like. In the example shown, a duplexer 21 is provided to enable a single antenna 26 to be used for both transmission and reception; in addition, an additional antenna may be provided to construct a space-diversity configuration.

The memory 16 in the control unit 14 is used to store an outgoing call request; this memory can be constructed using, for example, part of an area in a random-access memory or in a register within a microprocessor. The outgoing call processor 17 is responsible for control of the memory 16, starting control of the timer 18, and call answer control, as well as transmission control of outgoing call information including the mobile terminal number and destination subscriber number. The incoming call processor 19 detects an incoming call and activates a buzzer to indicate an incoming call; when an answer button or the like on a dial keypad 25 of a transceiver unit 15 is pressed to respond to the incoming call, the outgoing call processor 17 is made to transmit call answer information under the control of the incoming call processor 19. In order that transmission and reception can be performed on the assigned communication channels, the channel controller 20 controls the synthesizer 13 which sets the local-oscillator frequencies applied to the transmitting section 11 and receiving section 12. Furthermore, after the end of a call, the synthesizer 13 varies the output frequencies to seize a control channel.

The transceiver unit 15 comprises a transmitter 22, a receiver 23, a transceiver circuit 24 including a hybrid circuit, etc., a dial keypad 25 including various function buttons, etc., and a display not shown. A calling operation is performed using the dial keypad 25, etc. The transceiver unit 15 is usually connected to the mobile terminal main unit by a cable, but a cordless configuration may be employed. Furthermore, the transceiver unit 15 itself may be equipped with a radio transmitter and receiver and may be made detachable from the mobile terminal main unit; in this case, when the transceiver unit 15 is connected to the mobile terminal main unit, the mobile terminal main unit is used as a booster.

Figure 2:
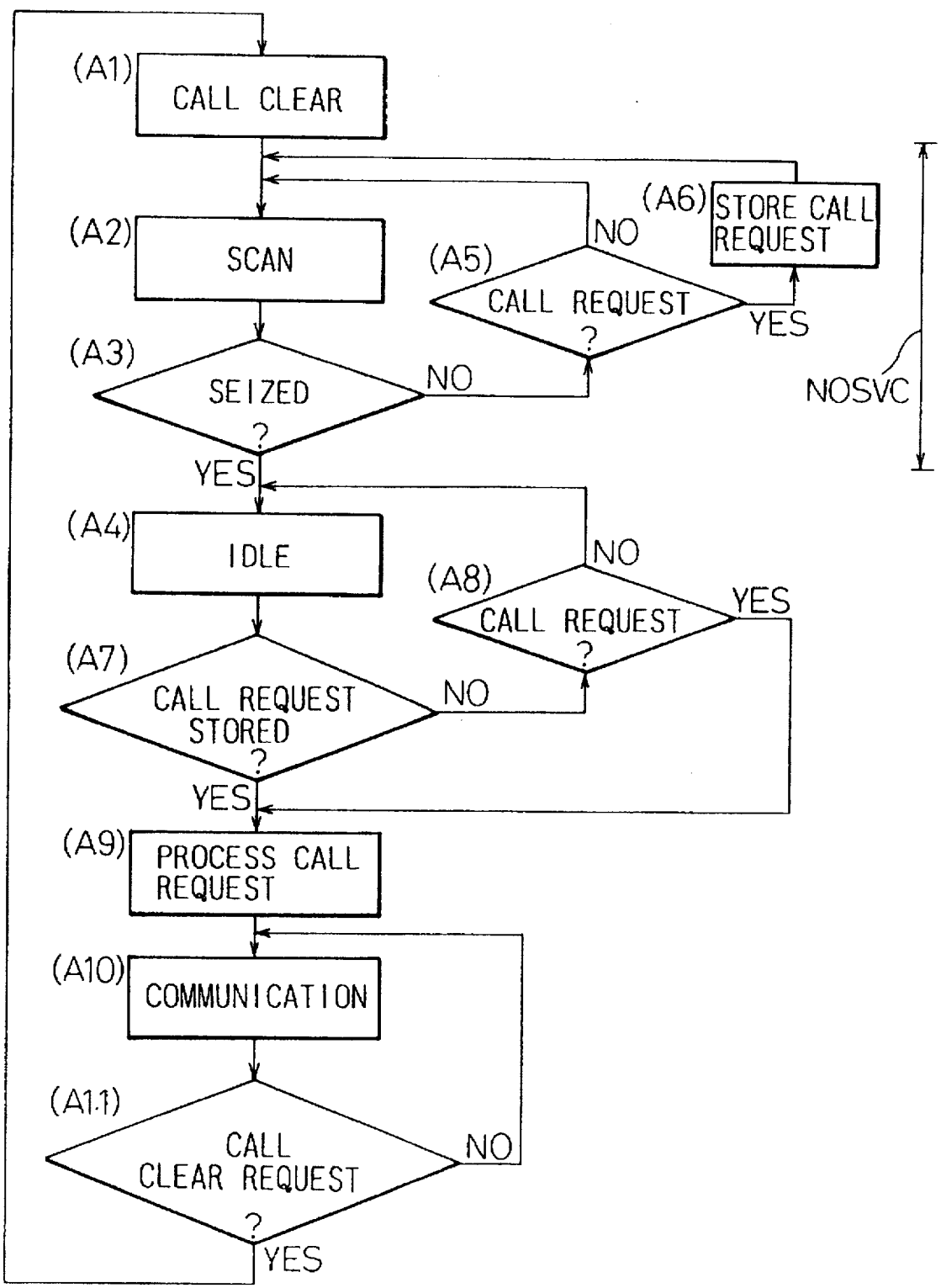
FIG. 2 is a flowchart for explaining the operation of a control unit 14 in the mobile terminal according to one embodiment of the present invention.
Figure 2:
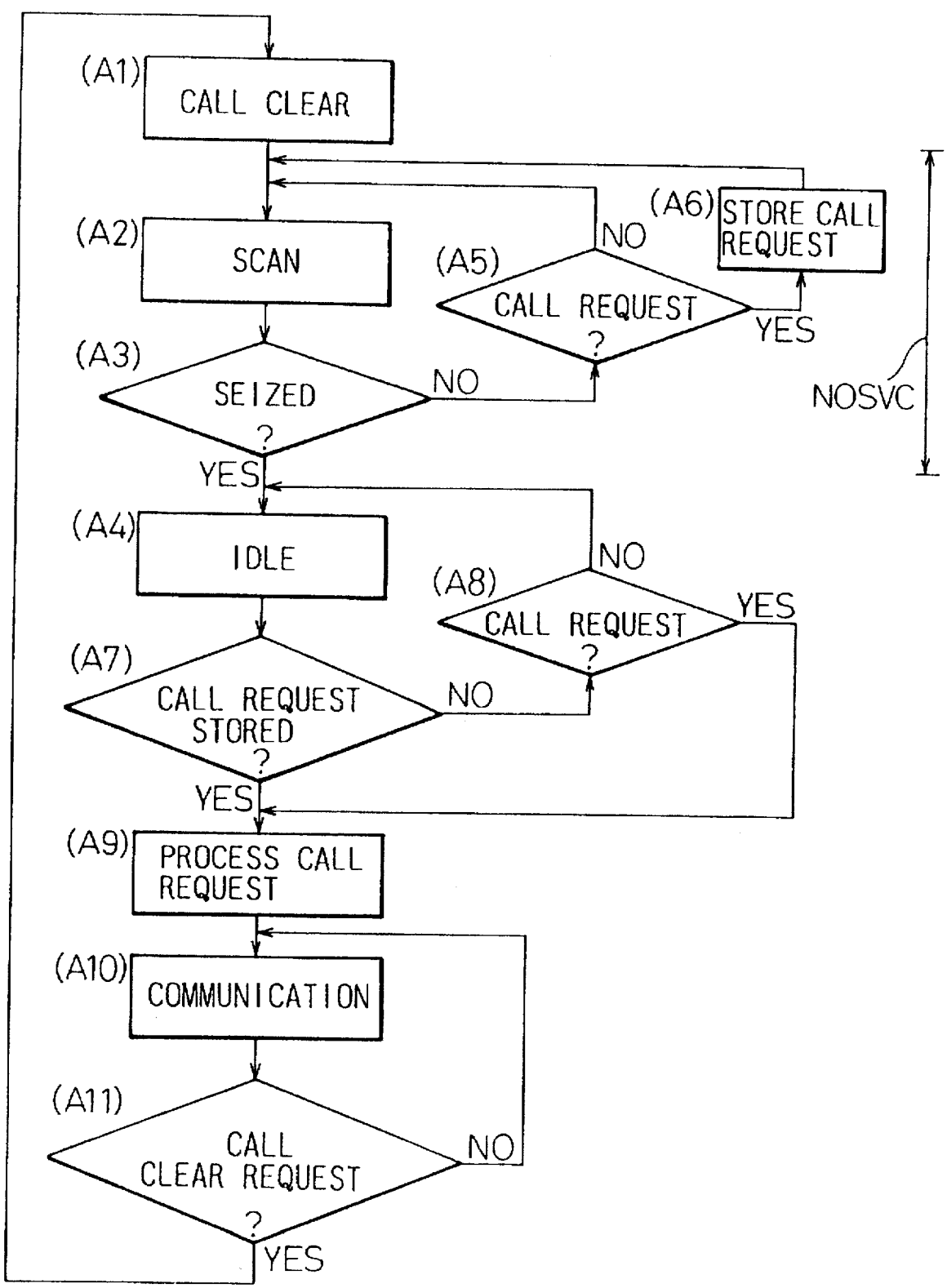

FIG. 2 is a flowchart for explaining the operation of the control unit 14 in the mobile terminal according to an embodiment of the invention. In FIG. 2, at the completion of a call, a call clearing operation is performed (A1), and under the control of the channel controller 20, the synthesizer 13 performs a channel scan to seize a control channel (A2). Then, it is determined whether the control channel has been seized or not (A3). When the control channel has been seized, the mobile terminal is placed in an idle mode (standby mode) until a call request arises (A4).

The period from call clearing (A1) to control channel seizure (A3) is called NOSVC during which a call request to the base station is disabled. It is determined whether any call request has been made during the NOSVC period (A5), and if YES, the call request is stored (A6). That is, the call request made immediately after the end of a call is stored in the memory 16.

Then, after the control channel has been seized, it is checked whether any call request stored (A7), and if there is a call request stored, or if there is no such call request but thereafter a call request is detected (A8), the outgoing call processor 17 performs an outgoing call processing operation (A9) whereby the destination subscriber is called and a communication mode (A10) is entered when the called subscriber goes off-hook. Next, it is determined whether a call clear request is detected (A11); when a call clear request is detected at the end of the call, a call clearing operation is performed (A1).

As described, if a call request is made immediately after the end of a call, such a call request is not disabled, but a calling operation is automatically performed in accordance with the call request after the control channel has been seized. This enhances the operability of the mobile terminal.

The embodiment of FIG. 2, however, presents a problem in situations where it takes a considerable time before a control channel is seized, or where an attempt to seize a control channel has failed after a call request, which is made during the process of control channel seizure, is stored. Usually, the seizure of a control channel is complete in a few seconds, but when no control channel is available, or when radio propagation conditions are not good enough, it may take a considerable time before a control channel is seized, or the mobile terminal may not be able to seize a control channel after attempting for a long time. If it takes a long time to seize a control channel, the user may become uneasy since the call request is stored during that time, or in some cases, the calling operation may take place when the user has forgotten that he requested the call. On the other hand, if the control channel seizure has failed, the call request remains stored, which may make the user think that his mobile terminal has failed.

Figure 3:
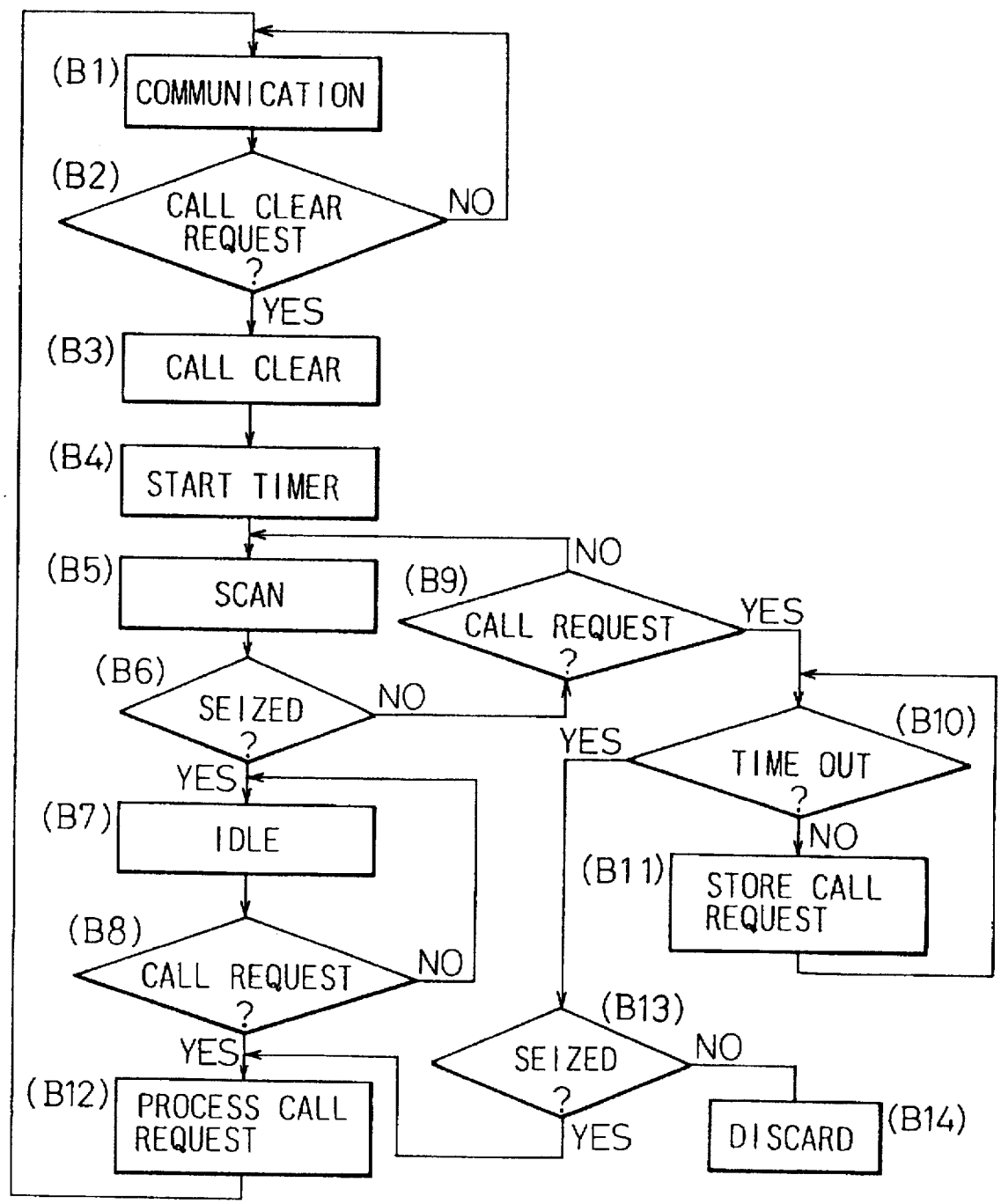
FIG. 3 is a flowchart for explaining the operation of a control unit 14 in the mobile terminal according to another embodiment of the present invention.

FIG. 3 is a flowchart for explaining the operation of the control unit 14 in the mobile terminal according to another embodiment of the invention which ameliorates the above-described problem. In FIG. 3, when the user is engaged in a communication with a remote party through his transceiver unit 15 (B1), the presence or absence of a call clear request is detected (B2); when a call clear request is signalled by pressing a call clear button or the like on the dial keypad 25 at the end of a call, the outgoing call processor 17 and the incoming call processor 19 perform a call clearing operation (B3), and the timer 18 is started (B4). The timer 18 in this embodiment is set to a time longer than the time usually required to seize a control channel.

After the end of the call, the channel controller 20 controls the synthesizer 13 which performs a channel scan to seize a control channel (B5). Then, it is determined whether a control channel has been seized or not (B6); if a control channel has not been seized yet, the presence or absence of a call request is checked (B9). If there is any call request entered from the dial keypad 25 of the transceiver unit 15, then it is determined whether the time set in the timer 18 has expired (B10), and if the time has not expired yet (B11), the call request is stored (B11). That is, the call request is stored in the memory 16.

When it is determined in step B6 that a control channel has been seized, an idle mode is entered (B7). Then, the presence or absence of a call request is checked (B8), and if there is a call request, the outgoing call processor 17 performs a calling operation (B12). On the other hand, when a call request has been stored in step B11, the channel seizing operation is continued in another task. During that time, if the time set in timer 18 elapses, it is determined whether a control channel has been seized or not (B13), and if seized, the outgoing call processor 17 performs a calling operation (B12). More specifically, the call request made immediately after the end of a call is stored, and when the time set in the timer 18, i.e. the time required to seize a control channel, has elapsed, the outgoing call processor 17 performs a calling operation in accordance with the call request stored in the memory 16. In this manner, when a call request is made immediately after the end of a call, the call request is stored, and after the time allowed for the seizure of a control channel has elapsed, the call request is processed. This enhances the operability of the mobile terminal. If no control channel has been seized before the time set in the timer 18 elapses, the call request is discarded (B14).

FIG. 4 is a flowchart for explaining the operation of the control unit 14 in the mobile terminal according to a further embodiment of the invention. In FIG. 4, as in the above-described process, when the user is engaged in communication with a remote party through his transceiver unit 15 (C1), the presence or absence of a call clear request is detected (C2); when a call clear request is signalled by pressing a call clear button or the like on the dial keypad 25 at the end of a call, the outgoing call processor 17 and the incoming call processor 19 perform a call clearing operation (C3), upon which the timer 18 is started.

After the end of the call, the channel controller 20 controls the synthesizer 13 and performs channel scan to seize a control channel (C5). Then, it is determined whether a control channel has been seized or not (C6); if the control channel has not been seized, then the presence or absence of a call request is checked (C11). If there is any call request entered from the dial keypad 25 of the transceiver unit 15, the call request is stored (C12). Then, it is determined whether any call request is stored (C13) and, if no request stored, the process proceeds to step C5.

If any call request is on hold, then it is determined whether the time set in the timer 18 has elapsed or not (C14); if the time has not elapsed, the process proceeds to step C5, and if the time has elapsed, the stored call request is discarded (C15). This prevents a call request from being stored indefinitely when a control channel cannot be seized. In this case, the display indicates that the call request has been disabled.

When a control channel is seized, an idle mode (standby mode) is entered (C7), and the presence or absence of a stored call request is detected by examining whether any call request is stored in the memory 16 (C8). When there is no such stored request, then it is determined whether any call request has arisen (C9). If a call request has arisen, or if there is a stored call request, the outgoing call processor 17 performs a calling operation (C10).

Figure 5:
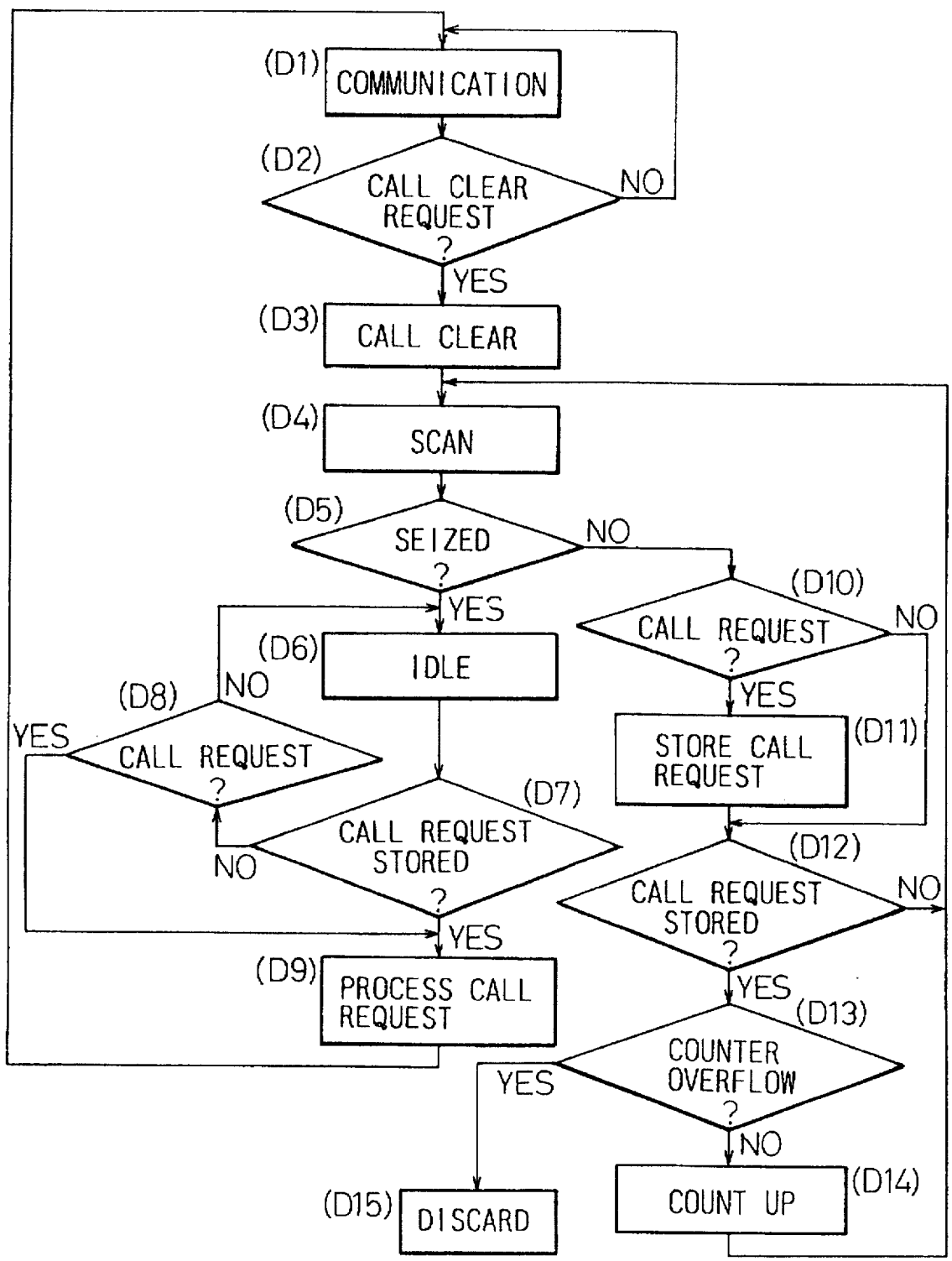
FIG. 5 is a flowchart for explaining the operation of a control unit 14 in the mobile terminal according to a still further embodiment of the present invention.

FIG. 5 is a flowchart for explaining the operation of the control unit 14 in the mobile terminal according to a still further embodiment of the invention. This embodiment is identical to the foregoing embodiment in FIG. 4, except that the timer in FIG. 4 is replaced by a counter. In FIG. 5, when in a communication mode 10 (D1), the presence or absence of a call clear request is detected (D2). Upon detection of a call clear request, a call clearing operation is performed (D3), and a channel scan is performed to seize a control channel (D4), after which it is determined whether a control channel has been seized or not (D5).

If the control channel has not been seized, the presence or absence of a call request is checked (D10), and if there is a call request, the call request is stored in the memory 16 (D11). Next, it is determined whether any call request is stored (D12); if not, the process proceeds to step D4. If there is a stored call request, then it is determined whether the counter has overflowed, that is, whether the counter has exceeded a predetermined value (D13). If the counter has overflowed, the call request kept on hold is discarded (D15). If the counter has not overflowed it is incremented (D14), and the process proceeds to step D4.

In the idle mode (standby mode) (D6) after the control channel has been seized, it is determined whether there is any stored call request (D7). If there is no such request, then it is determined whether any call request has arisen (D8). If a call request has arisen, or if there is a stored call request, the outgoing call processor 17 performs a calling operation (D9).

The counter is used to detect whether the control channel seizing operation has failed after attempting for a predetermined length of time. The counter is counted-up by one every time the steps D4, D5 and D10 to D14 are performed. When the counter has reached the predetermined value, the outgoing call processor 17 controls the memory 16 to erase the call request stored in it, thereby disabling the stored call request.

We claim:

1. A mobile terminal comprising:

means for seizing a control channel by scanning through frequencies;

means for storing a call request that arises during the time that said control channel seizing means is scanning through frequencies; and means for automatically initiating a calling operation after said control channel seizing means has seized a control channel when said call request is stored by said call request storing means.

2. A mobile terminal according to claim 1, wherein said automatic calling operation initiating means includes means for detecting the seizure of the control channel by said control channel seizing means, and means for initiating the calling operation after said seizure detecting means detects the seizure of the control channel.

3. A mobile terminal according to claim 2, wherein said automatic calling operation initiating means further includes means for measuring the time elapsed since said control channel seizing means started scanning through frequencies, and means for discarding said call request when the elapsed time being measured by said elapsed time measuring means reaches a predetermined time before said seizure detecting means detects the seizure of the control channel.

4. A mobile terminal according to claim 1, wherein said automatic calling operation initiating means includes means for measuring the time that has elapsed since said control channel seizing means started scanning through frequencies, and means for initiating the calling operation when the elapsed time being measured by said elapsed time measuring means reaches a predetermined time.

5. A mobile terminal according to claim 4, wherein said automatic calling operation initiating means further includes means for discarding said call request if said control channel seizing means has not seized the control channel when the elapsed time being measured by said elapsed time measuring means reaches the predetermined time.

* * * * *